(12) United States Patent
Shimizu

(10) Patent No.: US 6,666,289 B2
(45) Date of Patent: Dec. 23, 2003

(54) MAGNETISM PREVENTION STRUCTURE OF A MOTOR ASSIST APPARATUS FOR A VEHICLE

(75) Inventor: Michinori Shimizu, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 57 days.

(21) Appl. No.: 09/949,535

(22) Filed: Sep. 7, 2001

(65) Prior Publication Data

US 2002/0047352 A1 Apr. 25, 2002

(30) Foreign Application Priority Data

Sep. 18, 2000 (JP) ........................................ 2000-281269

(51) Int. Cl.$^7$ ................................................. B60K 1/00
(52) U.S. Cl. ..................... 180/65.2; 180/65.3; 180/53.1
(58) Field of Search ............................... 180/65.2, 65.1, 180/65.3, 65.4, 53.1; 310/86, 68 B (56) References Cited

U.S. PATENT DOCUMENTS

| 6,202,776 | B1 | * | 3/2001 | Masberg et al. ............ 180/65.2 |
| 6,311,495 | B1 | | 11/2001 | Shimizu et al. ................ 60/718 |
| 6,373,155 | B1 | * | 4/2002 | Shimizu et al. ............. 310/68 B |
| 6,481,517 | B1 | | 11/2002 | Kobayashi et al. ......... 180/65.3 |
| 6,492,742 | B1 | * | 12/2002 | Fujikawa et al. ......... 290/40 C |
| 6,531,795 | B2 | * | 3/2003 | Weimer ........................ 310/53 |

FOREIGN PATENT DOCUMENTS

| JP | 11-078556 | | 3/1999 | |
| JP | 11-078558 | | 3/1999 | |
| JP | 2001-078380 | | 3/2001 | |
| JP | 2001-246951 | | 9/2001 | |
| JP | 2001251800 A | * | 9/2001 | ................ 180/65.2 |

* cited by examiner

Primary Examiner—Brian L. Johnson
Assistant Examiner—Bridget Avery
(74) Attorney, Agent, or Firm—Flynn, Thiel, Boutell & Tanis, P. C.

(57) ABSTRACT

The purpose of this invention is to prevent magnetic flux and electric wave noise leaking from electric motor from affecting the magnetism prevention components of other materials, to reduce the number of assemblies and number to be assembled, and to fulfill reduction of cost. For this purpose, the present invention provides a magnetism prevention structure of a motor assist apparatus for a vehicle, having an electric motor which is directly connected with an engine and consists of a motor rotor and a motor stator, comprising: a rotational position sensor which consists of a sensor rotor and a sensor stator, wherein said motor stator and said sensor stator are each attached to a motor case installed in a cylinder block of the engine. The motor rotor and the sensor rotor are each attached to a rotor installation member that is installed in a crank shaft; and the motor assist apparatus which integrates a magnetism prevention part to prevent magnetic flux and/or electric wave noise leaking from the electric motor from leaking through the motor case between motor rotor and motor stator of electric motor and a signal line connected to the sensor stator of said rotational position sensor and/or the sensor stator.

14 Claims, 6 Drawing Sheets

MAGNETISM PREVENTION STRUCTURE OF A MOTOR ASSIST APPARATUS FOR A VEHICLE

FIELD OF THE INVENTION

This invention relates to a magnetism prevention structure of a motor assist apparatus for a vehicle, and particularly to a magnetism prevention structure of a motor assist apparatus for a vehicle, which can shield various engine components from magnetic flux and electric wave noise generated by an electric motor without having to arrange for affecting magnetism prevention utilizing other components. The magnetism prevention structure of this invention can reduce the number of assemblies and the number of assemblies to assemble, and can therefore reduce costs.

BACKGROUND OF THE INVENTION

With respect to vehicles, there is a so-called hybrid vehicle, which includes an electric motor (motor), driven by electricity and directly connected to an engine that is driven by combustion of fuel, and the driving force of the engine is assisted by the driving force of the electric motor.

The motor assist apparatus for a vehicle includes the electric motor which can function as a power generator, and includes a rotational position sensor to detect the rotational position of this electric motor. A control means is provided for controlling the motor assist apparatus in relation to a traveling state of the engine so that a high level of performance is attained (such as fuel efficiency, lower values of detrimental components in exhaust gases, and power performance).

Examples of such a motor assist apparatus for a vehicle are disclosed in published Japanese Application Laid-Open Nos. 11-78556 and 11-78558. The motor assist apparatus for vehicle disclosed in published Japanese Patent Application Laid-Open No. 11-78556 includes a preventing member for preventing metal powder produced from the clutch mechanism from invading a motor generator. The motor assist apparatus for vehicle disclosed in published Japanese Patent Application Laid-Open No. 11-78558 includes a shielding member disposed between an engine and a motor generator for shielding electric current and magnetic flux emitted from the motor generator.

However, a motor assist apparatus for a vehicle generates magnetic flux and electric wave noise from the motor stator when the electric motor is being driven and functioning as a power generator. There is a problem that such magnetic flux and electric wave noise may negatively influence other components, such as a rotational position sensor.

Therefore, the motor assist apparatus for a vehicle indicated in each of the above disclosures, includes a shielding member positioned between the engine and the motor generators to prevent electric current and magnetic flux from leaking out of a coil of the motor generator to negatively influence the rotational operation of a crank shaft of the engine which consists of a metal substance, and allows stability of rotational operation.

However, because the above motor assist apparatuses include a position detecting sensor which detects the rotational position of the rotor relative to the stator, magnetic flux and electric wave noise leaking from the stator can negatively influence the position detection sensor and cause noise to occur in a detection signal of the position detection sensor and deterioration of control precision of the electric motor. Additionally, because the above motor assist apparatuses include a separate shielding member, there is the inconvenience of increased number of assemblies and increased numbers of assemblies to assemble.

In order to obviate or minimize the above inconvenience, the present invention provides a magnetism prevention structure of a motor assist apparatus for a vehicle, having an electric motor that can function as a power generator and is driven by electricity, which is directly connected to an engine driven by combustion of fuel, and consists of a motor rotor and a motor stator that is arranged so as to correspond to the motor rotor, comprising: a rotational position sensor that includes a sensor rotor and a sensor stator that is arranged for correspondence to the sensor rotor. The rotational position sensor can detect the rotational position of the motor rotor relative to the motor stator. The motor stator and the sensor stator are each installed in a motor case that is installed in a cylinder block of the engine, and the motor rotor and the sensor rotor are each installed to a rotor installation member that is installed in the crank shaft of the engine. The motor assist apparatus for a vehicle provides a magnetism prevention part integrated into the motor case to prevent magnetic flux and/or electric wave noise from leaking from the electric motor between the motor rotor and the motor stator of the electric motor and a signal line connected to the sensor stator of the rotational position sensor and/or the sensor stator.

In this invention, because the magnetism prevention structure of a motor assist apparatus for a vehicle provides a magnetism prevention part integrated with the motor case to prevent magnetic flux and/or electric wave noise from leaking from the motor stator between the motor rotor and the motor stator of the electric motor and a signal line connected to the sensor stator of the rotational position sensor, this magnetism prevention structure can shield the rotational position sensor and/or signal line from magnetic flux and electric wave noise leaking from the electric motor, without having to arrange for magnetism prevention utilizing other components, or a detection signal of rotational position sensor passing through the signal line, and in addition the rotational position sensor as well, can avoid receiving a negative influence that is caused by magnetic flux and electric wave noise leaking from electric motor. In addition, because the magnetism prevention structure integrates the magnetism prevention part with the motor case, the number of assemblies and the number of assemblies to assemble can be reduced.

DETAILED DESCRIPTION

An explanation will be given of embodiments according to the invention in reference to the drawings as follows.

Figure 3:
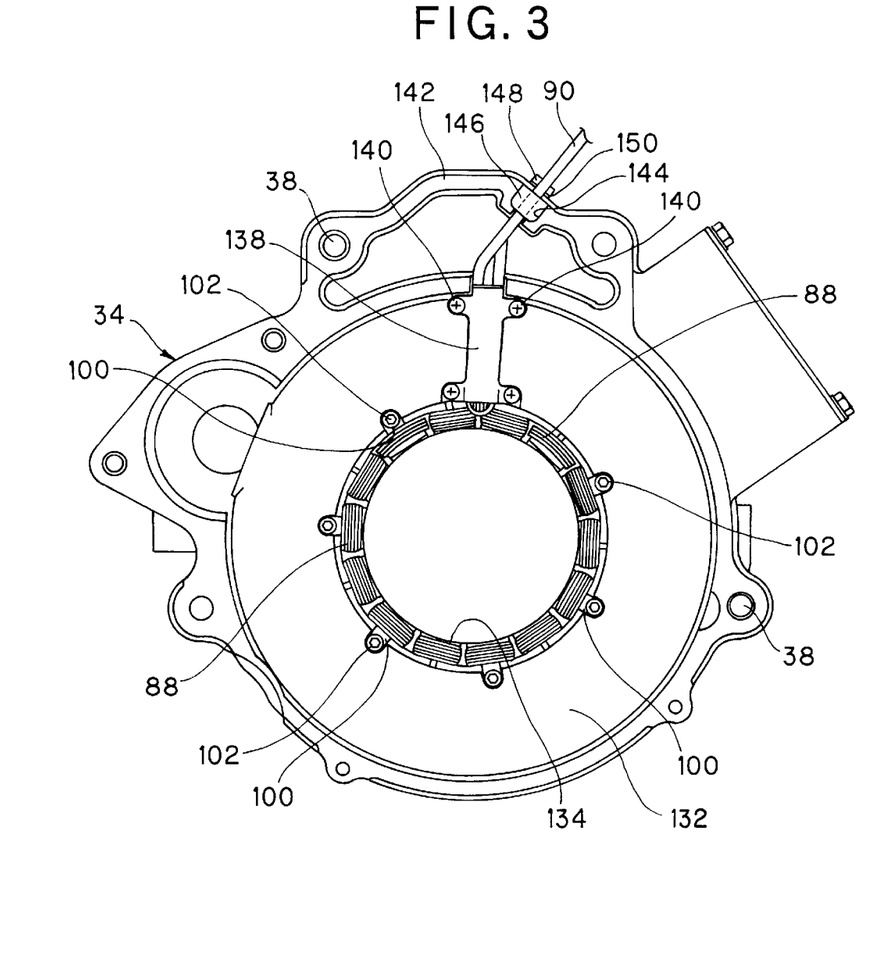
FIG. 3 is a front view of a motor case indicated by the arrow III of FIG. 2.
Figure 4:
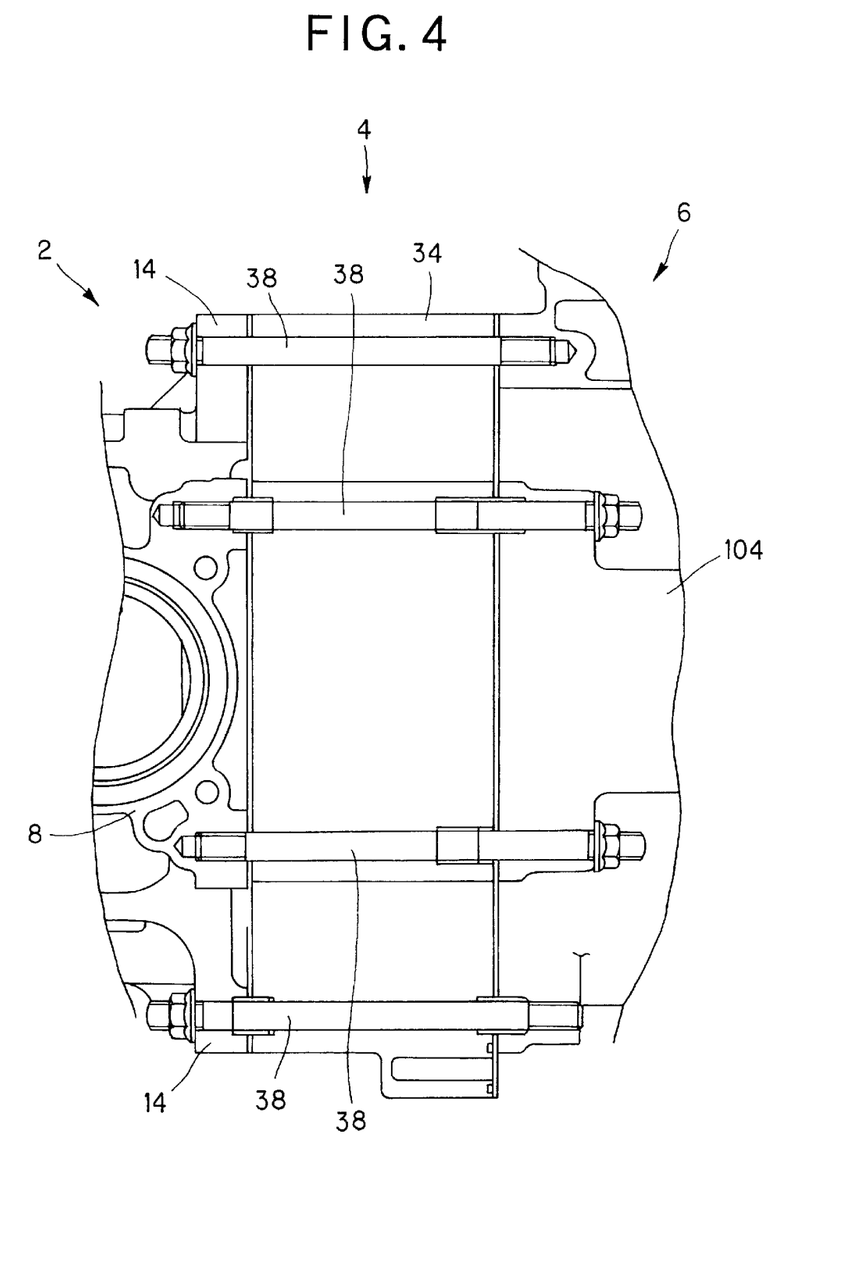
FIG. 4 is a cross-sectional view showing a rigid fastening of a cylinder block, a lower case, a motor case and a transmission case.
Figure 5:
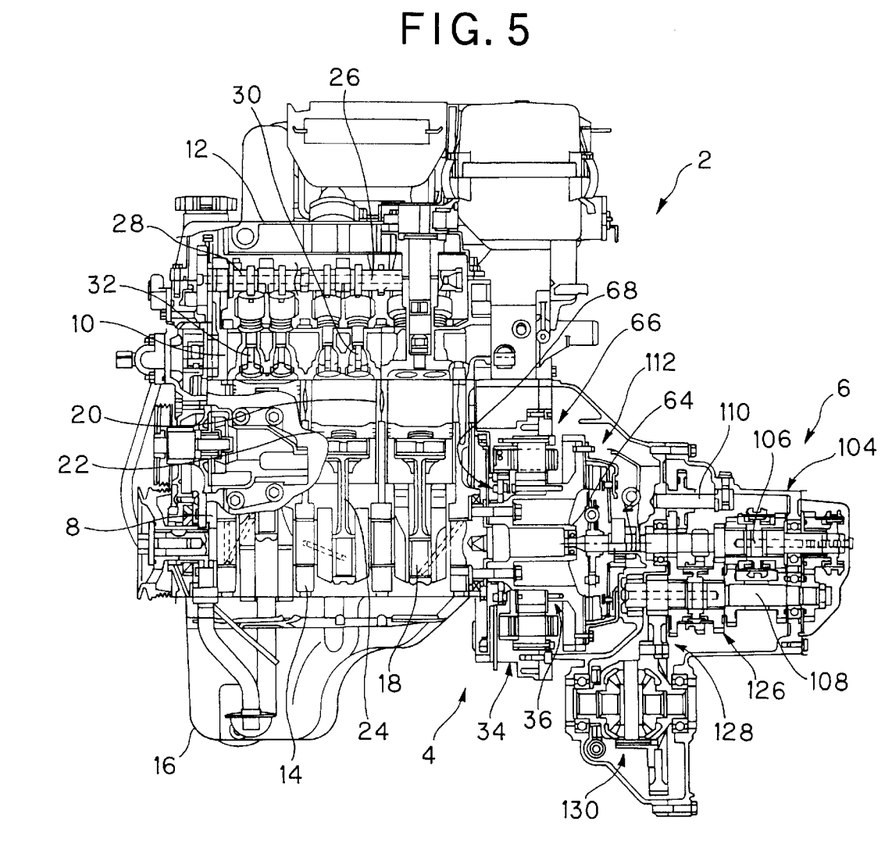
FIG. 5 is a cross-sectional view of an engine having a motor assist apparatus for a vehicle.

FIGS. 1–5 show a first embodiment according to the invention. In FIG. 5, reference numeral 2 denotes an engine mounted on a vehicle (not shown); 4 a motor assist apparatus for a vehicle; and 6 a transmission. The engine 2 is driven by combustion of fuel, and is connected to the transmission 6 through the motor assist apparatus 4 for a vehicle.

The engine 2 has a cylinder block 8, a cylinder head 10, a head cover 12, a lower case 14 and an oilpan 16, and a crank shaft 18 that is supported by the lower case 14 in a lower section of the cylinder block 8. A piston 22 which is built in cylinder 20 so as to slide smoothly is connected to the crank shaft 18 by cone rod 24.

In addition, the engine 2 includes an intake camshaft 26 and an exhaust camshaft 28 that rotate in synchronization about the crank shaft 18. The camshafts are supported in the cylinder head 10. The intake camshaft 26 and the exhaust camshaft 28 drive an intake valve 30 and an exhaust valve 32 of each cylinder 20, respectively.

Motor assist apparatus 4 is connected to the output side of crank shaft 18 of engine 2. Motor assist apparatus 4 is integrated with the motor case 34 attached to cylinder block 8 at the output end of crank shaft 18, and includes a rotor installation member 36 attached to the output end of crank shaft 18. Motor case 34 and rotor installation member 36 are formed of a non-magnetic material such as aluminum, stainless steel or the like.

Figure 2:
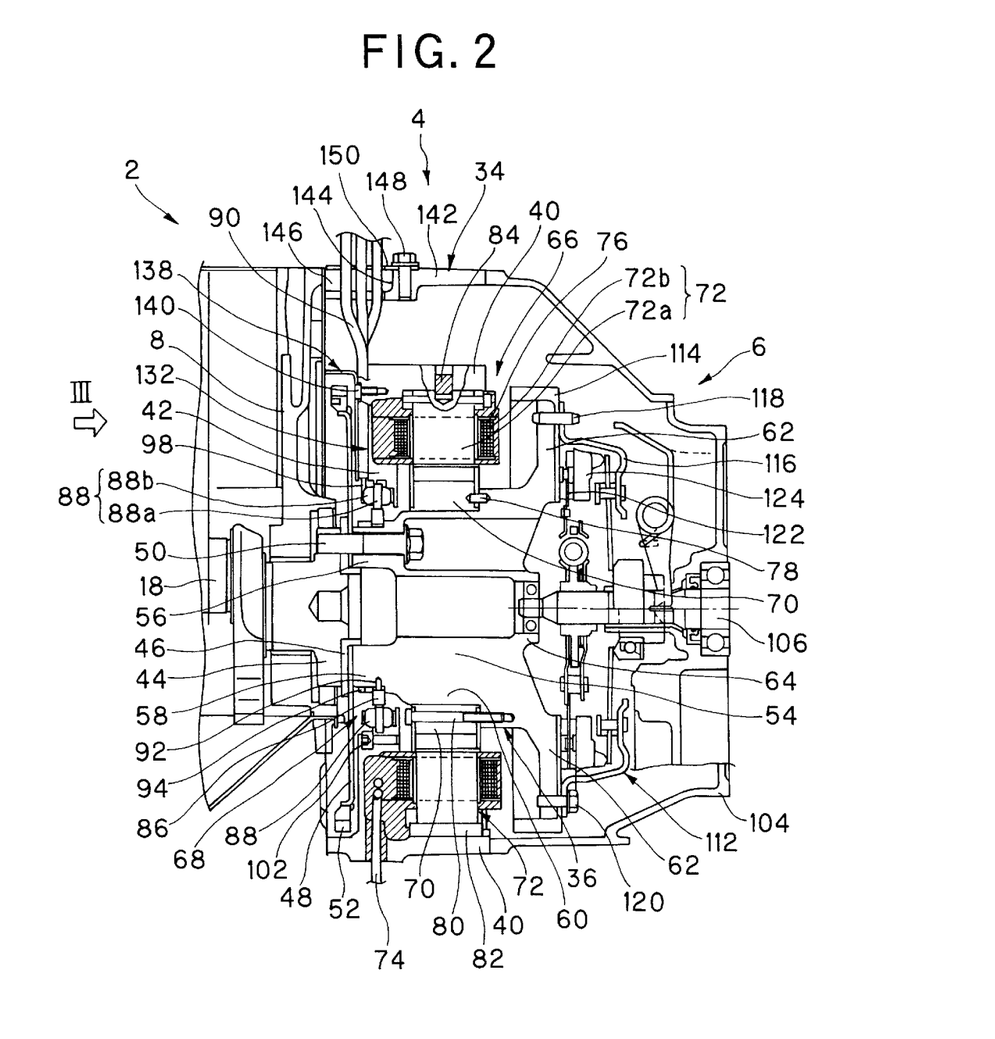
FIG. 2 is a cross-sectional view of a motor assist apparatus for a vehicle.

The motor case 34, as shown in FIGS. 2 and 3, is installed in or on cylinder block 8 by installation bolt 38 in conjunction with a transmission case 104 as discussed below. A motor stator installation part 40, having a cylinder shape, is disposed in motor case 34 toward the transmission 6, and a sensor stator installation part 42, having a circle shape, is disposed in motor case 34 toward the engine 2, midway between which is an electromagnetic wave prevention part 132 discussed below.

The rotor installation member 36 includes both a flange member 46 and a drive plate 48 that are positioned on a crank shaft side installation part 44 of the output end of crank shaft 18. These components are tightened together with an installation bolt 50. A starter driven gear 52 is attached to an outer circumferential edge of drive plate 48. A starter drive gear of the starter motor that is not illustrated is engaged with driven gear 52.

In rotor installation member 36, a cylinder part 54 is included that extends toward the transmission 6 from the engine 2. In the end of cylinder part 54 disposed toward the engine 2, a motor side installation part 56 is installed by an installation bolt 50 and is arranged in the crank shaft side of installation part 44. Sensor rotor installation part 58 is tangentially arranged in the outer circumferential side of this motor side installation part 56 disposed toward the engine 2, and a motor rotor installation part 60 is tangentially arranged in the outer circumferential side of an intermediate part of cylinder part 54. Flywheel 62, having a circle board shape, is arranged in an outer circumferential side of cylinder part 54 disposed toward the transmission 6, and shaft supporting part 64 of input shaft 106, described below, is arranged in adjacent an inner side of cylinder part 54 disposed toward the transmission 6.

Motor assist apparatus 4 for vehicle directly connects the electric motor (motor) having a power generator function and being driven by electricity to the output side end of crank shaft 18, and includes a rotational position sensor 68 that detects the rotational position of electric motor 66.

The electric motor 66 includes a motor rotor 70 and a motor stator 72 that is arranged to correspond to this motor rotor 70. Motor stator 72 has a motor stator core part 72a and a motor stator coil part 72b, and connects electric power line 74 to motor stator coil part 72b. Motor stator coil part 72b, as shown in FIG. 2 by a slanted line, is sealed by a mold 76 in order to improve waterproofing, and to improve electrical insulation, and cooling functions.

Motor rotor 70 of electric motor 66 is positioned by a knock pin 78 in motor rotor installation part 60 of rotor installation member 36. Motor rotor 70 is then secured to motor rotor installation part 60 by an installation bolt 80. Motor stator core part 72a of motor stator 72 engages motor stator installation part 40 of motor case 34 from the transmission 6 side. The motor stator 72 is then positioned by key 82, and is shrink fit and installed by knock pin 84 which penetrates the circumference of motor stator 72.

The rotational position sensor 68 consists of a sensor rotor 86 and a sensor stator 88 that is arranged to correspond to this sensor rotor 86, to detect the rotational position of motor rotor 70 relative to motor stator 72. Sensor stator 88 has a sensor stator core part 88a and a sensor stator coil part 88b, and connects a signal line 90 to sensor stator coil part 88b. The signal line 90 includes, for example, a pair of shielded lines or wires to provide electromagnetism noise resistance and radio wave noise resistance.

Sensor rotor 86 of rotational position sensor 68 is positioned in the sensor rotor installation part 58 of rotor installation member 36 by knock pin 92, and is installed by a bush 94. Sensor stator 88 engages sensor stator core part 88a in sensor stator installation part 42 of motor case 34 from the engine side, and after being positioned by knock pin 98, is secured by a clamp 100 with installation bolt 102. The signal line 90 extends radially from sensor stator 88 on the engine side of motor case 34.

Therefore, the motor stator 72 is installed in the motor case 34 in opposition to the sensor stator 88 with the magnetism prevention part 132 midway between these components.

Motor assist apparatus 4 for a vehicle, as shown in FIGS. 4 and 5, is connected to transmission 6 on the flywheel side. The transmission 6 includes a transmission case 104 that is attached to motor case 34 by an installation bolt 38 and cylinder block 8 of engine 2 and lower case 14.

In the transmission 6, input shaft 106 is supported in shaft support section 64 of rotor installation member 36 and the transmission case 104. An output shaft 108 is supported in the transmission case 104 and is oriented to the input shaft 106. A reverse idler shaft 110 is supported in transmission case 104 and is oriented parallel to the input shaft 106 and the output shaft 108.

The transmission 6 includes a clutch 112 positioned between the end of input shaft 106 and flywheel 62 of rotor installation member 36. Clutch 112 includes a flywheel plate 114 and a clutch cover 116 that are positioned on flywheel 62 by a knock pin 118. The flywheel plate 114 and the cover 116 are then secured to flywheel 62 by installation bolt 120.

The clutch 112 includes a pressure plate 124 that presses upon a clutch disk 122 that is arranged so as to axially move, but not to rotate, on input shaft 106 with respect to flywheel plate 114. The clutch disk 122 is thus axially movable into engagement with flywheel plate 114 and out of engagement with flywheel plate 114. Consequently, the clutch transmits the driving force of engine 2 and electric motor 66 to the input shaft 106 of transmission 6, and disengages the engine 2 and motor 66 from the transmission 6.

Transmission 6 converts rotational speed and torque of the driving force input through clutch 112 with a speed changeover gear line 126 of forward/reverse step that is arranged between the input shaft 106 and the output shaft 108 and the reverse idler shaft 110, and transmits to a differential 130 supported in the transmission case 104 by a final reduction gear line 128, and transmits driving force to the right and left drive axles which are not illustrated.

Figure 1:
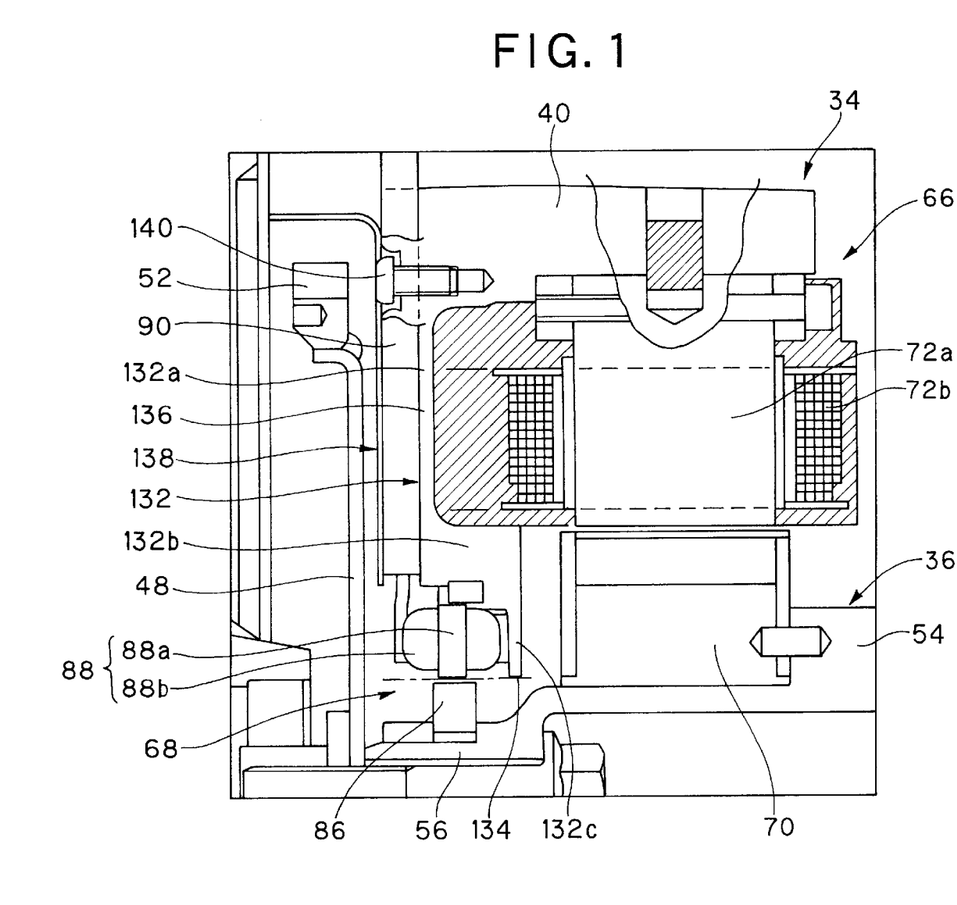
FIG. 1 is a main cross-sectional view of an electric motor and a rotational position sensor, showing a first embodiment of a magnetism prevention structure of a motor assist apparatus for a vehicle.

The motor assist apparatus 4 for a vehicle, as shown in FIG. 1, integrates a magnetism prevention part 132 into motor case 34 to prevent magnetic flux and/or electric wave noise from leaking from electric motor 66 between the motor rotor 70 and the motor stator 72 of the electric motor 66 and the signal line 90 connected to sensor stator 88 of rotational position sensor 68 and/or this sensor stator 88.

Magnetism prevention part 132 is integrated with motor case 34 and is formed of materials such as aluminum, stainless steel or another non-magnetic substance having magnetism prevention properties. Magnetism prevention part 132 is formed of an outer circumferential part 132a, an intermediate part 132b and an internal circumferential part 132c having a substantially circular, plate-like shape so that the thickness of its thinnest portion is more than 2 mm.

The outer circumferential part 132a projects toward the center side from motor stator installation part 40, and is positioned between motor stator 72 and signal line 90. Intermediate part 132b projects toward transmission 6 from the inner circumferential side of outer circumferential part 132a, and is positioned between motor stator 72 and sensor stator 88 and between motor rotor 70 and signal line 90 as well. Internal circumferential part 132c projects toward the center side from intermediate part 132b and is located on the transmission side between motor rotor 70 and sensor stator 88.

The motor case 34 defines an insertion hole 134 that has a diameter which is approximately equal to a diameter of sensor stator 88 and cylinder part 54 of rotor installation member 36 is inserted into this hole 134, i.e. within the inner circumferential side of internal circumference part 132c of magnetism prevention part 132 between motor rotor 70 and sensor stator 88. Motor side installation part 56 of cylinder part 54 of rotor installation member 36 is inserted in the insertion hole 134.

In addition, the engine 2 side of the motor case 34 defines a radial groove part 136 that signal line 90 fits into to facilitate installation of sensor stator 88. This groove part 136 is formed in the engine 2 side of the outer circumferential part 132a and the intermediate part 132b of the magnetism prevention part 132. A cover 138 is installed on motor case 34 via an installation bolt 140 to cover the signal line 90 and protects the signal line 90 from rotation of the drive plate 48.

Signal line 90, which is in groove part 136, is connected with sensor stator 88 of rotational position sensor 68, as shown in FIGS. 2 and 3, and is routed outwardly while being maintained by a bush 146 that is engaged in an engaging hole 144 that opens from the engine 2 side of outer wall 142 of motor case 34 and is connected to a control means (not shown). The bush 146 is secured in the engaging hole 144 by a maintenance plate 150 that is installed in the outer wall 142 by an installation bolt 148. Incidentally, the electric power line 74 connected to the motor stator 72 of the electric motor 66 is led to the outside of the motor case 34 so as to be away from the signal line 90 and is connected to the control means (not shown).

Next, an explanation will be given of the operation of first embodiment.

This motor assist apparatus 4 for a vehicle, because it is arranged between the engine 2 and transmission 6 mounted on the vehicle, can be mounted between the engine 2 and transmission 6 mounted on an existing vehicle. As a result, this invention can prevent a rise of cost.

The magnetism prevention structure of this motor assist apparatus 4 is integrated with motor case 34 and rotor installation member 36 and is from a formed non-magnetic substance. Accordingly, this magnetism prevention structure can shield rotational position detection sensor 68 and signal line 90 from magnetism and can be impervious to negative magnetic influence. As a result, the magnetism prevention structure can prevent reduction of efficiency of electric motor 66 and can improve signal precision that rotational position detection sensor 68 detects.

The magnetism prevention structure of this motor assist apparatus 4 provides a magnetism prevention part 132 integrated with motor case 34 to prevent magnetic flux and/or electric wave noise from leaking from electric motor 66 between motor rotor 70 and motor stator 72 of electric motor 66 and signal line 90 connected to sensor stator 88 of rotational position sensor 68 and/or this sensor stator 88.

By this means, this magnetism prevention structure can shield rotational position sensor 68 and/or signal line 90 from magnetic flux and electric wave noise leaking from the electric motor, without having to arrange magnetism prevention components as before. Signal line 90 through which passes a detection signal of rotational position sensor 68, in addition to rotational position sensor 68 as well, can avoid being negatively influenced by magnetic flux and electric wave noise leaking from electric motor 66. In addition, because the magnetism prevention structure integrates the magnetism prevention part 132 with the motor case 34, the number of assemblies and the number of assemblies to assemble can be reduced.

Accordingly, this magnetism prevention structure of motor assist apparatus 4 can reduce noise that occurs in the signal of rotational position sensor 68, can improve control precision of electric motor 66, can prevent reduction of efficiency of electric motor 66, and can improve the reliability. In addition, this magnetism prevention structure can shield from magnetic flux and electric wave noise that electric motor 66 generates, without having to arrange for magnetism prevention utilizing other components of other materials, can reduce the number of assemblies and the number of assemblies to assemble, and can fulfill reduction of cost.

Further, because the magnetism prevention structure of motor assist apparatus 4 includes a magnetism prevention part 132 of motor case 34 that is arranged midway between motor stator installation part 40 in transmission 6 side and sensor stator installation part 42 in engine 2 side, the magnetism prevention structure allows motor stator 72 and sensor stator 88 to be installed in opposition to each other with magnetism prevention part 132 midway between these components.

Accordingly, because this magnetism prevention structure includes the magnetism prevention part 132 positioned midway between motor stator 72 and sensor stator 88, the magnetism prevention structure can avoid being negatively influenced by magnetic flux and electric wave noise leaking from electric motor 66. As a result, the reliability of this structure may be improved.

Furthermore, in motor case 34, sensor stator 88 is installed on the engine side of magnetism prevention part 132, and signal line 90 is connected to sensor stator 88 and is placed in groove part 136 on the engine side of magnetism prevention part 132, and the signal line 90 is routed outside and maintained by bush 146 that is engaged in an engaging hole 144 which opens on engine 2 side of motor case 34.

Accordingly, due to the arrangement of this magnetism prevention structure, sensor stator 88 and signal line 90 can easily be changed without the need to take off other assemblies, because sensor stator 88 of rotational position sensor 68 is mounted on the engine side of motor case 34 alone, consequently, the magnetism prevention structure can simplify maintenance.

Furthermore, the motor case 34 forms an insertion hole 134 that is approximately equal in size to an inner diameter of sensor stator 88 and cylinder part 54 of rotor installation member 36 is inserted in the inner circumferential side of internal circumference part 132c of magnetism prevention part 132 located in between motor rotor 70 and sensor stator 88.

Accordingly, this magnetism prevention structure can shield sensor stator 88 because the internal circumference part 132c of magnetism prevention part 132 of motor case 34 is formed of a non-magnetic substance and the cylinder part 54 of inserted rotor installation member 36 is inserted in insertion hole 134 of the internal circumference part 132c. Consequently, the magnetism prevention structure can prevent reduction of efficiency of electric motor 66 and can improve signal precision that the rotational position detection sensor 68 detects.

In addition, because this magnetism prevention structure of the motor assist apparatus 4 includes a magnetism prevention part 132 oriented to intercept magnetism noise and electric wave noise that electric motor 66 generates and because magnetism prevention part 132, motor case 34 and rotor installation member 36 are formed of a non-magnetic substance, sensor stator 88 can be effectively shielded from magnetism noise and electric wave noise that electric motor 66 generates. As a result, this invention can contribute to improvement of signal precision that rotational position detection sensor 68 detects.

Additionally, because this magnetism prevention structure of motor assist apparatus 4 for vehicle routes signal line 90 (connect to sensor stator 88) outwardly through bush 146 that is engaged in an engaging hole 144 which opens on engine side of outer wall 142 of motor case 34, waterproofing of motor case 34 can be improved, and reduction of function due to water leakage can be prevented.

Figure 6:
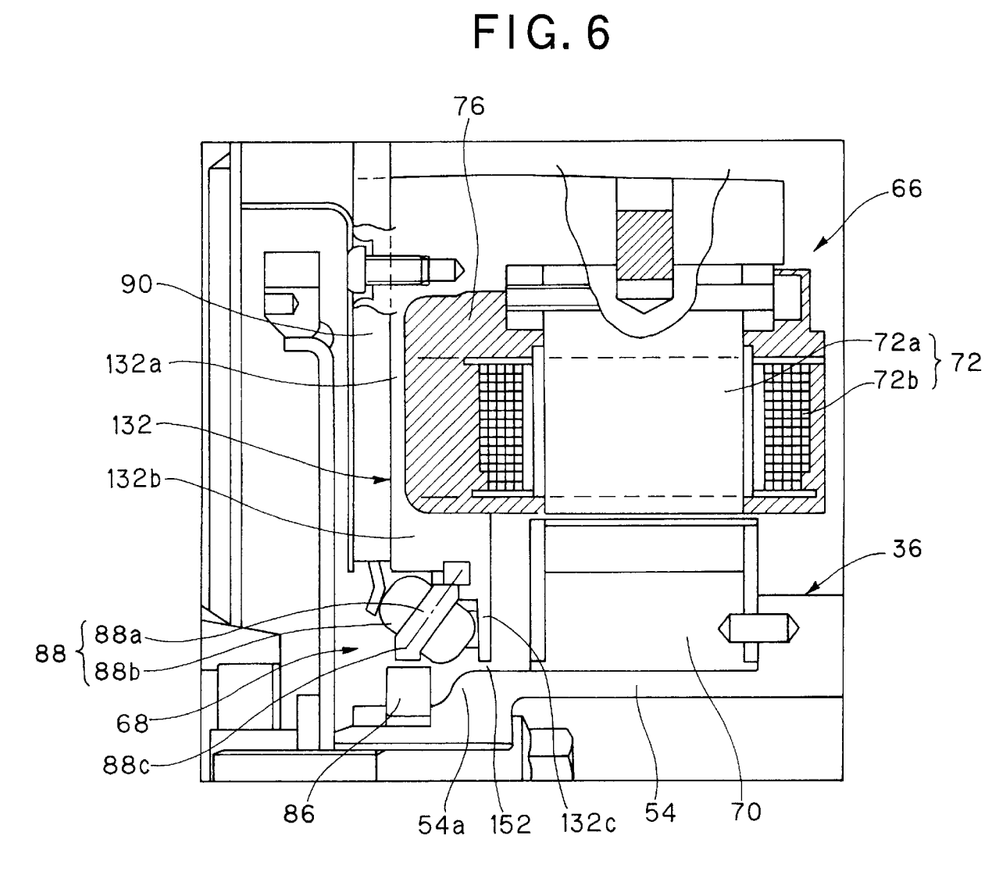
FIG. 6 is a main cross-sectional view of an electric motor and a rotational position sensor, showing a second embodiment.

FIG. 6 shows a second embodiment. The motor assist apparatus for a vehicle according to the second embodiment provides sensor stator 88 of rotational position sensor 68 that is installed in sensor stator installation part 42 of motor case 34 so that the axis line of sensor stator core part 88a is tilted with respect to the axis line of electric motor 66, and an extension part 54a is formed which extends and projects toward the engine side in cylinder part 54 of rotor installation member 36, so as to come closer to insertion hole 134 of internal circumference part 132c of magnetism prevention part 132.

In motor assist apparatus 4 for vehicle of the second embodiment, sensor stator 88 can be shielded by the internal circumference part 132c and cylinder part 54, since the space 152 between the internal circumference part 132c and cylinder part 54 is small, and the internal circumference part 132c of magnetism prevention part 132 which is formed of a non-magnetic substance approaches and overlaps extension part 54a of cylinder part 54 of rotor installation member 36 which is also formed of non-magnetic substance. Accordingly, this invention can effectively shield from magnetism noise and electric wave noise generated by electric motor 66, and can improve signal precision that rotational position detection sensor 68 detects.

Incidentally, in the above embodiment, motor stator coil part 72b of motor stator 72 of electric motor 66 is sealed by forming same with mold 76, and by sealing to form motor stator coil part 72b with a mold 76 or coating including a non-magnetic substance having magnetism prevention properties, magnetic flux and electric wave noise leaking from electric motor 66 can be prevented. Accordingly, this means that negative influence to sensor stator 98 and signal line 90 and can reduce generation of noise in the detection signal of rotational position sensor 68.

Additionally, the magnetism prevention property of magnetism prevention part 132 can be improved by increasing its thickness, utilizing space in motor case 34. For example, the magnetism prevention part 132, as shown in FIG. 1, increases its thickness on the motor rotor 70 side, utilizing space on the side of intermediate part 132b and internal circumference part 132c opposite to motor rotor 70, and can have an improved property of magnetism prevention for motor rotor 70 and motor stator 72.

Thus, the magnetism prevention structure of the motor assist apparatus of present invention provides a magnetism prevention part integrated with the motor case between the electric motor and the rotational position sensor and/or signal line. Accordingly, the magnetism prevention structure can shield the rotational position sensor and signal line from magnetic flux and electric wave noise leaking from electric motor, without arranging for magnetism prevention with other components as before, and for the signal line which carries a detection signal of rotational position sensor, in addition to rotational position sensor as well, can avoid receiving negative influence that is caused by magnetic flux and electric wave noise leaking from electric motor. In addition, because the magnetism prevention structure integrates the magnetism prevention part with the motor case, the number of assemblies and the number of assemblies to assemble can be reduced.

Accordingly, this magnetism prevention structure of motor assist apparatus 4 for vehicle, can reduce noise that occurs in the detection signal of the rotational position sensor, can improve control precision of an electric motor, can prevent reduction of efficiency of an electric motor, and can improve the reliability. In addition, this magnetism prevention structure can shield from magnetic flux and electric wave noise that the electric motor generates, without arranging for magnetism prevention with components, can reduce number of assemblies and the number to be assembled, and can fulfill reduction of cost.

What is claimed is:

1. A magnetism prevention structure of a motor assist apparatus for a vehicle, the motor assist apparatus having an electric motor that can function as a power generator and is driven by electrical energy, the motor assist apparatus being directly connected with an engine driven by combustion of fuel and including a motor rotor and a motor stator disposed for correspondence to the motor rotor, comprising:

a rotational position sensor including a sensor rotor and a sensor stator disposed for correspondence to the sensor rotor, so as to detect a rotational position of said motor rotor relative to said motor stator, wherein said motor stator and said sensor stator are each attached to a motor case installed in a cylinder block of said engine, and said motor rotor and said sensor rotor are each attached to a rotor installation member installed in a crank shaft of said engine; and said motor assist apparatus including a magnetism prevention part integrated with a motor case to prevent magnetic flux and/or electric wave noise from leaking from said electric motor between said motor rotor and said motor stator and a signal line connected to said sensor stator of said rotational position sensor and/or said sensor stator.

2. A magnetism prevention structure of a motor assist apparatus for a vehicle as defined in claim 1, wherein said motor stator and said sensor stator are attached on opposite sides to said motor case, with said magnetism prevention part between said motor stator and said motor rotor.

3. A magnetism prevention structure of a motor assist apparatus for a vehicle as defined in claim 1, wherein said motor case defines an insertion hole that has an approximately equal size as a bore of said sensor stator and a cylinder part of said rotor installation member is inserted in an inner circumferential side of an internal circumference part of said magnetism prevention part located between said motor rotor and said sensor stator.

4. A magnetism prevention structure of a motor assist apparatus for a vehicle as defined in claim 1, wherein said motor case and said rotor installation member are formed from a non-magnetic substance.

5. A magnetism prevention structure of a motor assist apparatus for a vehicle as defined in claim 2, wherein an engine side of said motor case defines a groove in which said signal line is disposed to aid in installation of said sensor stator.

6. A magnetism prevention structure of a motor assist apparatus for a vehicle as defined in claim 2, wherein said motor case and said rotor installation member are formed from a non-magnetic substance.

7. A magnetism prevention structure of a motor assist apparatus for a vehicle as defined in claim 3, wherein said motor case and said rotor installation member are formed from a non-magnetic substance.

8. A magnetism prevention structure of a motor assist apparatus for a vehicle as defined in claim 5, wherein said motor case and said rotor installation member are formed from a non-magnetic substance.

9. A motor assist apparatus for a vehicle including an electric motor driven by electrical energy and functioning as a generator, the electric motor being directly connected to an engine driven by the combustion of fuel and including a motor rotor and a motor stator disposed adjacent the motor rotor, said motor assist apparatus comprising:

a rotational position sensor for detecting the rotational position of the motor rotor relative to the motor stator, and including a sensor rotor and a sensor stator disposed adjacent the sensor rotor, the sensor stator and the motor stator being mounted to a motor case of said motor assist apparatus, and the sensor rotor and the motor rotor being mounted for rotation with a crankshaft of the engine; and a non-magnetic member for shielding the rotational position sensor from at least one of magnetic flux and electrical wave noise emitted from the electric motor, said non-magnetic member being integral with the motor case and being disposed between the electric motor and the rotational position sensor.

10. The motor assist apparatus of claim 9 wherein said non-magnetic member is generally annular in shape and is defined by an outer circumferential portion which is generally radially oriented and disposed between said motor stator and a signal line connected to said sensor stator, an intermediate portion which projects generally axially from an inner circumferential region of said outer circumferential portion and is disposed between said motor stator and said sensor stator and also between said motor rotor and said signal line, and an inner circumferential portion which projects generally radially from an inner circumferential region of said intermediate portion and is disposed between said motor rotor and said sensor stator.

11. The motor assist apparatus of claim 9 including a signal line connected to said sensor stator, and said non-magnetic member has a portion disposed between said motor stator and said signal line.

12. The motor assist apparatus of claim 10 wherein a generally radially extending groove is defined in both said outer circumferential portion and said intermediate portion of said non-magnetic member, said signal line being disposed in said groove and extending radially inwardly for connection to said sensor stator.

13. The motor assist apparatus of claim 11 wherein said portion defines therein a generally radially oriented groove in which said signal line is disposed, said groove being disposed towards an engine side of said motor case.

14. The motor assist apparatus of claim 13 including a cover mounted on said portion over said signal line to protect same.

* * * * *